(12) United States Patent
Kroiss

(10) Patent No.: US 9,108,759 B2
(45) Date of Patent: Aug. 18, 2015

(54) INTERLOCKING CRATING BATTEN SYSTEM

(71) Applicant: Peter Konrad Kroiss, Willow Springs, IL (US)

(72) Inventor: Peter Konrad Kroiss, Willow Springs, IL (US)

(*) Notice: Subject to any disclaimer, the term of this patent is extended or adjusted under 35 U.S.C. 154(b) by 117 days.

(21) Appl. No.: 14/026,943

(22) Filed: Sep. 13, 2013

(65) Prior Publication Data
US 2014/0069058 A1 Mar. 13, 2014

Related U.S. Application Data

(60) Provisional application No. 61/700,415, filed on Sep. 13, 2012.

(51) Int. Cl.
*B60P 7/08* (2006.01)
*B65D 6/36* (2006.01)
*B60P 7/16* (2006.01)

(52) U.S. Cl.
CPC .... *B65D 9/36* (2013.01); *B60P 7/16* (2013.01)

(58) Field of Classification Search
CPC ................................. B60P 1/16; B65D 9/36
USPC ........... 410/43, 87, 117, 154, 155; 248/345.1, 248/615; 217/52
See application file for complete search history.

(56) References Cited

U.S. PATENT DOCUMENTS 5,876,165 A * 3/1999 Campbell ................. 410/43

\* cited by examiner

*Primary Examiner* — Stephen Gordon

(57) ABSTRACT

An interlocking crating batten system may include a middle section that has a top portion, a top edge, a bottom portion, a first end portion and a second end portion. The first end portion has a concave area and the second end portion has a convex area. The first end portion has a least one tab extended out from the bottom portion of the middle section. A base section may have a least one slot along a primary end. The base section may lay between the middle section and a crate, with at least one slot removably engaged with at least one tab. An attachment device may connect the middle section and the base section to the crate.

4 Claims, 4 Drawing Sheets

INTERLOCKING CRATING BATTEN SYSTEM

CROSS-REFERENCE TO RELATED APPLICATION

This application claims the benefit of U.S. provisional application No. 61/700,415, filed Sep. 13, 2012, the contents of which are herein incorporated by reference.

BACKGROUND OF THE INVENTION

The present invention relates to crate batten systems and, more particularly, to an interlocking crating batten system.

Currently, wooden crate battens are glued and nailed in place. These crate battens are handmade and rub on the face of finished materials and are hard to replace. Wooden battens do not have glides, making insertion and removal of materials difficult. Side walls on wooden battens are straight and covered with felt, causing rub marks or polishing on the face of the finished materials. They are glued and nailed into place making installation slow and removal difficult.

As can be seen, there is a need for an interlocking crating batten system that allows for different materials and a system that allows for quick installation and removal.

SUMMARY OF THE INVENTION

In one aspect of the present invention, an interlocking crating batten system comprises a middle section, having a top portion, a top edge, a bottom portion, a first end portion and a second end portion, wherein the first end portion has a concave area and the second end portion has a convex area, wherein the first end portion has at least one tab extended out from the bottom portion of the middle section; a base section having at least one slot along a primary end, wherein the base section lays between the middle section and a crate, wherein the at least one slot removably engages with the at least one tab; and an attachment device connecting the middle section and base section to the crate.

In another aspect of the present invention, a method of securing materials within a crate comprises lining up an interlocking crating batten system in a crate, wherein the interlocking crating batten system comprises a middle section, having a top portion, a top edge, a bottom portion, a first end portion and a second end portion, wherein the first end portion has a concave area and the second end portion has a convex area, wherein the first end portion has at least one tab extended out from the bottom portion of the middle section; a base section having at least one slot along a primary end, wherein the base section lays between the middle section and a crate, wherein the at least one slot removably engages with the at least one tab; and an attachment device connecting the middle section and the base section to the crate; providing space between each batten so that a finished material may be inserted into the space between each batten; attaching the interlocking crating batten system to the crate so that each batten may be interlocked to another batten by engaging the at least one tab of one batten to the at least one slot of another batten; and attaching additional battens as needed.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an interlocking crating batten system may include a middle section having a top portion, a top edge, a bottom portion, a first end portion and a second end portion. The first end portion has a concave area and the second end portion has a convex area. The first end portion has a least one tab extended out from the bottom portion of the middle section. A base section may have a least one slot along a primary end. The base section may lay between the middle section and a crate, with at least one slot removably engaged with at least one tab. An attachment device may connect the middle section and the base section to the crate.

Figure 1:
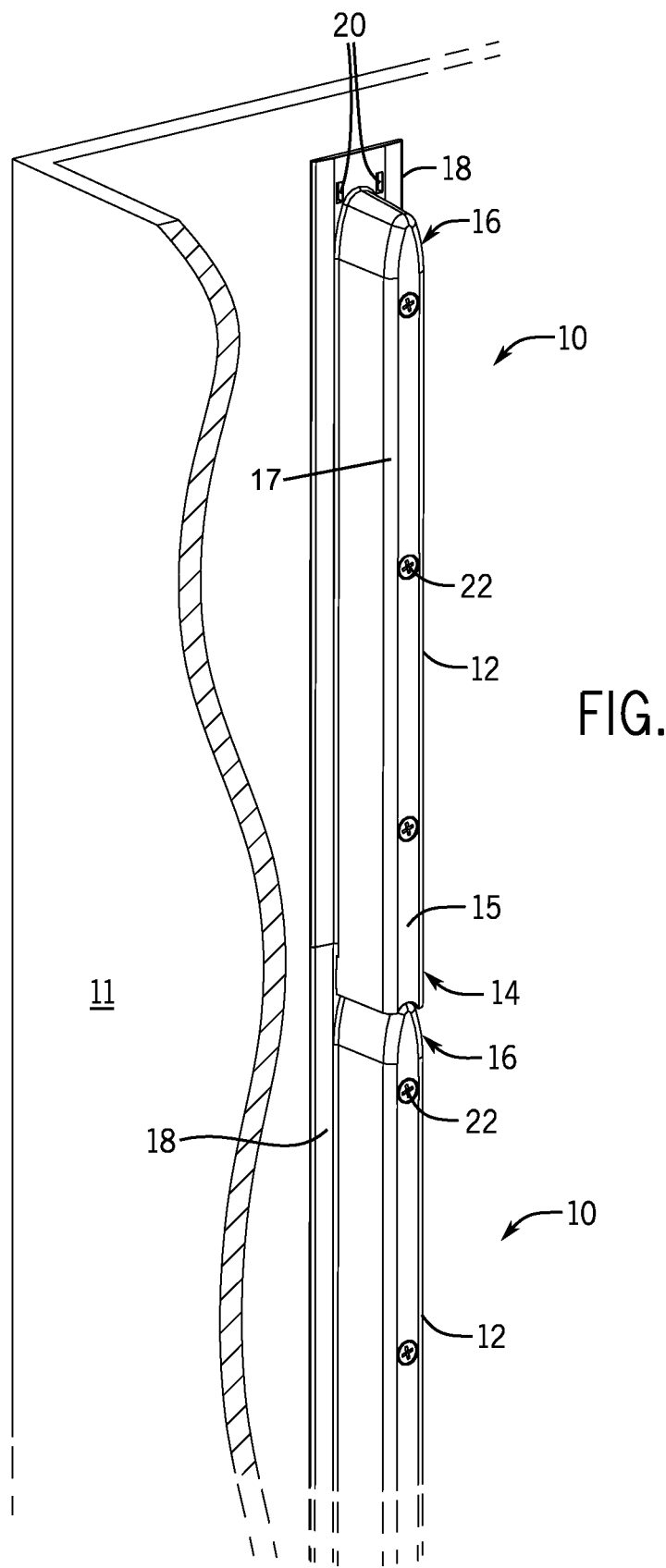
FIG. 1 is a front perspective view of an exemplary embodiment of the present invention in use.
Figure 2:
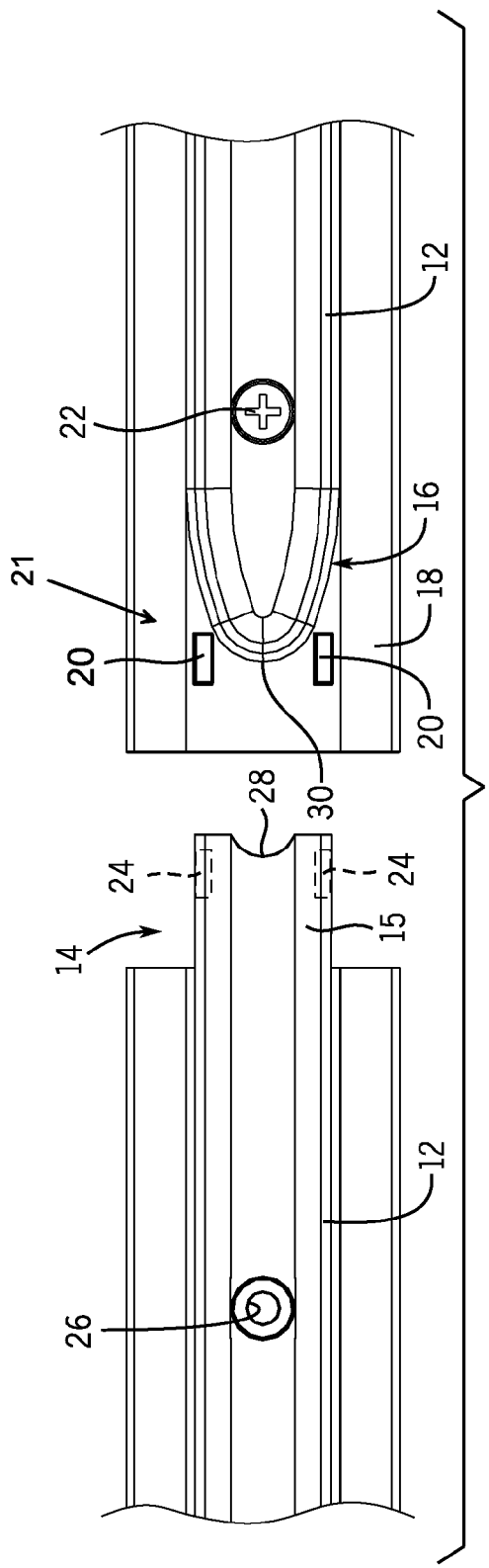
FIG. 2 is an exploded front elevation view of an exemplary embodiment of the present invention.
Figure 3:
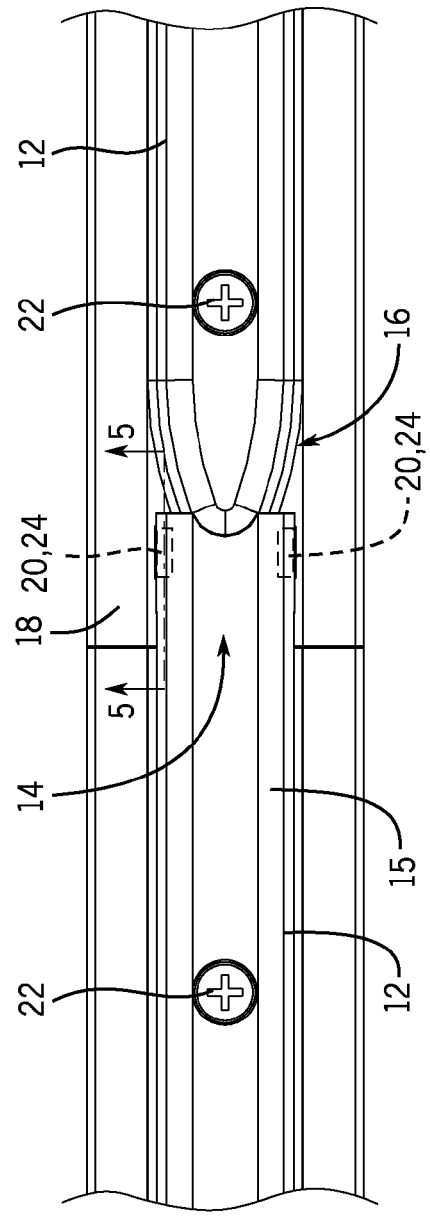
FIG. 3 is an assembled front elevation view of the elements of FIG. 2.
Figure 4:
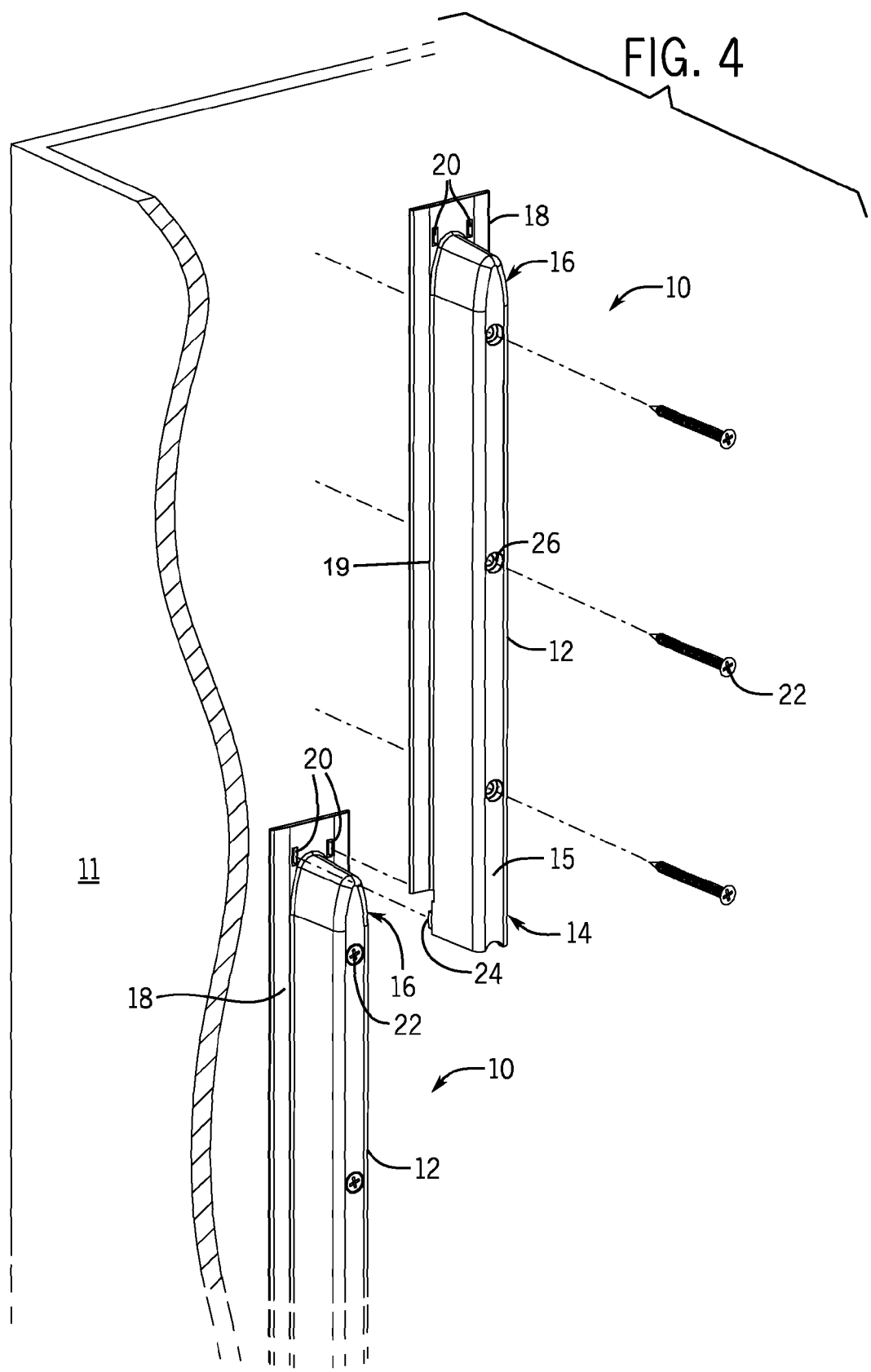
FIG. 4 is an exploded front perspective view of an exemplary embodiment of the present invention in use.
Figure 5:
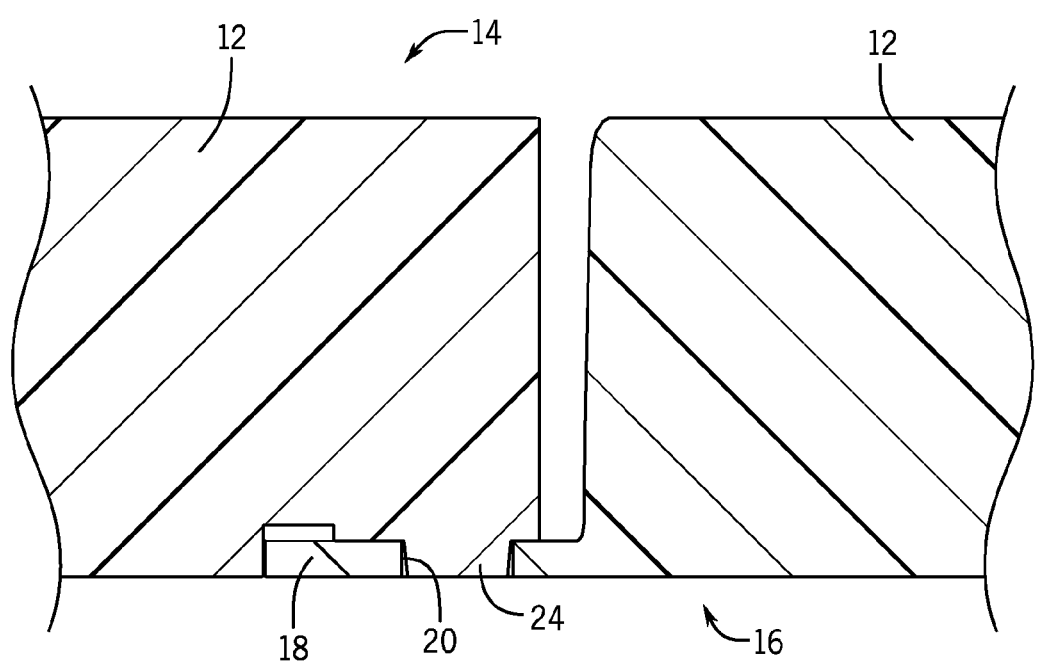
FIG. 5 is a cross-sectional view of an exemplary embodiment of the present invention taken on the line 5-5 of FIG. 3.

As is illustrated in FIGS. 1 through 5, an interlocking crating batten system 10 may include a middle section 12 and a base section 18. The interlocking crating batten system 10 may be removably attached to a crate 11. The middle section 12 may comprise a top portion 15. The top portion 15 may have a top edge 17. The top portion 15 may include a first end portion 14 and a second end portion 16. In between the first end portion 14 and the second end portion 16 along the top portion 15 of the middle section 12, may be an attachment device. In certain embodiments the attachment device may include a plurality of mounting holes 26 and a plurality of screws 22. The first end portion 14 may have a concave area 28. The second end portion 16 may have a convex area 30. The first end portion 14 may also have at least one tab 24 extended out from a bottom portion 19 of the middle section. The base section 18 may have a primary end 21. Along the primary end of the base section 18 may be at least one slot 20.

When multiple battens are required for use, the concave area 28 of the first end portion 14 of one piece may line up with the convex area 30 of the second end portion 16 of another piece. When the concave area 28 and the convex area 30 of multiple battens are positioned together, the base section 18 of each batten may line up to touch the base section 18 of the other batten. In certain embodiments, the at least one tab of the first end portion of the middle section, may engage with the at least one slot of the primary end of the base section. The attachment device may secure the batten or multiple battens to the crate 11, increasing the sturdiness of the structure.

In certain embodiments, the top edge of the middle section may be beveled. Beveling the top edge may minimize the surface contact making for an easy material insertion and removal. The beveling may also protect the face of the finished material from long term damage reducing repair costs to the packaged material and the crates.

A method of using the interlocking crating batten system may include determining what material may be being packed in a shipping container and position the battens as needed. An individual may trim off any excess material from the length of the base section pieces and attach the battens into place. The individual may allow for extra space to be in between from side to side so that the finished materials may fit comfortably between the middle sections of the battens. If contents of the crate may change, the interlocking crating batten system may be repositioned and used in a new configuration to accommodate the new materials.

It should be understood, of course, that the foregoing relates to exemplary embodiments of the invention and that modifications may be made without departing from the spirit and scope of the invention as set forth in the following claims.

What is claimed is:

1. An interlocking crating batten system comprising:
   a middle section, having a top portion, a top edge, a bottom portion, a first end portion and a second end portion, wherein the first end portion has a concave area and the second end portion has a convex area, wherein the first end portion has at least one tab extending out from the bottom portion of the middle section;
   a base section having at least one slot along a primary end, wherein the base section lays between the middle section and a crate, wherein the at least one slot removably engages with the at least one tab; and
   an attachment device connecting the middle section and the base section to the crate.

2. The interlocking crating batten system of claim 1, wherein the attachment device comprises a plurality of screws and a plurality of mounting holes through the middle section of the interlocking crating batten system.

3. The interlocking crating batten system of claim 1, wherein the base section and the middle section are made from plastic.

4. The interlocking crating batten system of claim 1, wherein the top edge of the middle section is beveled.

* * * * *